United States Patent
Dick et al.

(10) Patent No.: US 8,036,180 B2
(45) Date of Patent: *Oct. 11, 2011

(54) RANDOM ACCESS CHANNEL PREAMBLE

(75) Inventors: Stephen G. Dick, Nesconset, NY (US); Charles A. Dennean, Melville, NY (US); Eldad M. Zeira, Huntington, NY (US); Jung-Lin Pan, Smithtown, NY (US); Sung-Hyuk Shin, Northvale, NJ (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/430,414

(22) Filed: Apr. 27, 2009

(65) Prior Publication Data
US 2009/0245220 A1 Oct. 1, 2009

Related U.S. Application Data

(63) Continuation of application No. 11/305,283, filed on Dec. 16, 2005, now Pat. No. 7,529,210, which is a continuation of application No. 09/868,209, filed as application No. PCT/US99/29504 on Dec. 14, 1999, now abandoned.

(60) Provisional application No. 60/129,177, filed on Apr. 14, 1999, provisional application No. 60/125,418, filed on Mar. 22, 1999, provisional application No. 60/116,284, filed on Jan. 19, 1999, provisional application No. 60/112,299, filed on Dec. 14, 1998.

(51) Int. Cl.
*H04B 7/216* (2006.01)

(52) U.S. Cl. .......................... 370/335; 370/342; 370/441

(58) Field of Classification Search .................. None
See application file for complete search history.

(56) References Cited

U.S. PATENT DOCUMENTS

| | | | |
|---|---|---|---|
| 5,253,268 A | 10/1993 | Omura et al. | |
| 5,696,762 A | 12/1997 | Natali et al. | |
| 5,771,288 A | 6/1998 | Bottomley et al. | |
| 5,909,436 A | 6/1999 | Engstrom et al. | |
| 6,014,065 A | 1/2000 | Nishikawa | |
| 6,167,056 A | 12/2000 | Miller et al. | |
| 6,195,534 B1 | 2/2001 | Sakoda et al. | |
| 6,222,828 B1 | 4/2001 | Ohlson et al. | |
| 6,240,073 B1 | 5/2001 | Reichman et al. | |
| 6,259,724 B1 | 7/2001 | Esmailzadeh | |
| 6,347,120 B1 | 2/2002 | Sakoda | |

(Continued)

FOREIGN PATENT DOCUMENTS
EP 0378417 7/1990
(Continued)

OTHER PUBLICATIONS

3GPP, "3rd Generation Partnership Project; Technical Specification Group Radio Access Network; Physical Layer Procedures (FDD) (Release 1999)," 3GPP TS 25.214 V3.1.0 (Dec. 1999).

3GPP, "3rd Generation Partnership Project; Technical Specification Group Radio Access Network; Spreading and Modulation (FDD) (Release 1999)," 3GPP TS 25.213 V3.1.0 (Dec. 1999).

(Continued)

*Primary Examiner* — Chirag G Shah
*Assistant Examiner* — Ashkey L Shivers

(57) ABSTRACT

One out of sixteen preamble signatures is selected. A code is produced based on the selected preamble signature. The produced code is phase rotated to produce a processed preamble signature signal. The processed preamble signature signal is used in processing the CDMA RACH signal and the CDMA RACH signal is used to access a CDMA system.

7 Claims, 13 Drawing Sheets

U.S. PATENT DOCUMENTS

| | | |
|---|---|---|
| 6,539,236 B2 | 3/2003 | Hakkinen et al. |
| 6,549,564 B1 | 4/2003 | Popovic |
| 6,594,248 B1 | 7/2003 | Karna et al. |
| 6,606,313 B1 | 8/2003 | Dahlman et al. |
| 6,724,831 B1 | 4/2004 | Hasegawa et al. |
| 6,757,293 B1 | 6/2004 | Chuah et al. |
| 2002/0048316 A1 | 4/2002 | Imaizumi et al. |

FOREIGN PATENT DOCUMENTS

| | | |
|---|---|---|
| EP | 1109326 | 6/2001 |
| JP | 8-237169 | 9/1996 |
| JP | 10-233758 | 9/1998 |
| WO | 97/33383 | 9/1997 |
| WO | 98/18280 | 4/1998 |
| WO | 9818280 | 4/1998 |
| WO | 98/19390 | 5/1998 |
| WO | 9819390 | 5/1998 |
| WO | 98/49857 | 11/1998 |
| WO | 98/49859 | 11/1998 |
| WO | 9849859 | 11/1998 |
| WO | 2007/108648 | 9/2007 |

OTHER PUBLICATIONS

Third Generation Partnership Project, "Technical Specification Group Radio Access Network; Physical Layer Procedures (FDD) (Release 4)." 3GPP TS 25.214 v4.0.0 (Mar. 2001).

Third Generation Partnership Project, "Technical Specification Group Radio Access Network; Physical Layer Procedures (FDD) (Release 1999)." 3GPP TS 25.214 v3.6.0 (Mar. 2001).

Third Generation Partnership Project, "Technical Specification Group Radio Access Network; Spreading and modulation (FDD) (Release 4)," 3GPP TS 25.213 v4.0.0 (Mar. 2001).

Third Generation Partnership Project, "Technical Specification Group Radio Access Network; Spreading and modulation (FDD) (Release 1999)," 3GPP TS 25.213 v3.5.0 (Mar. 2001).

3GPP, "3$^{rd}$ Generation Partnership Project; Technical Specification Group Radio Access Network; Spreading and Modulation (FDD) (Release 1999)," 3GPP TS 25.213 V3.1.0 (Dec. 1999).

3GPP, "3$^{rd}$ Generation Partnership Project; Technical Specification Group Radio Access Network; Physical Layer Procedures (FDD) (Release 1999)," 3GPP TS 25.214 V3.1.0 (Dec. 1999).

3GPP, "3$^{rd}$ Generation Partnership Project; Technical Specification Group Radio Access Network; Spreading and Modulation (FDD) (Release 1999)," 3GPP TS 25.213 V3.1.0 (Dec. 1999).

| SIGNATURE | P0 | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|---|
| 1 | A | A | -A | -A | -A | -A | A | -A | -A | A | A | -A | A | -A | A | A |
| 2 | -A | A | -A | -A | A | A | A | -A | -A | A | -A | -A | -A | A | -A | A |
| 3 | A | -A | A | A | A | A | A | -A | -A | -A | A | A | -A | A | -A | A |
| 4 | -A | -A | -A | A | -A | -A | -A | -A | -A | -A | A | A | -A | A | A | A |
| 5 | A | A | A | -A | -A | -A | -A | A | A | -A | A | A | A | -A | A | A |
| 6 | -A | A | -A | -A | -A | -A | A | A | A | -A | -A | A | -A | A | -A | A |
| 7 | -A | -A | -A | A | A | A | A | -A | A | -A | -A | A | A | -A | A | A |
| 8 | A | -A | A | -A | -A | A | -A | -A | A | A | -A | A | -A | A | A | A |
| 9 | -A | A | A | A | A | -A | A | A | A | A | A | A | A | A | A | A |
| 10 | A | A | -A | -A | -A | A | -A | A | -A | A | A | -A | A | -A | -A | A |
| 11 | A | -A | -A | A | A | -A | -A | A | A | A | A | -A | -A | A | A | A |
| 12 | -A | -A | A | A | -A | A | A | -A | A | A | A | -A | -A | -A | A | A |
| 13 | A | A | A | A | -A | -A | A | A | A | A | A | -A | -A | -A | A | A |
| 14 | -A | A | -A | -A | -A | A | -A | -A | A | A | -A | A | A | A | A | A |
| 15 | A | -A | -A | A | A | -A | A | A | A | A | -A | A | A | -A | -A | A |
| 16 | -A | -A | A | A | -A | A | A | -A | -A | A | A | A | A | A | -A | A |

PREAMBLE SYMBOLS — 73

FIG. 2
PRIOR ART

PS: PREAMBLE SEQUENCE

POSITION 1: A FIRST SYMBOL ARRIVES IN THE FIRST SYMBOL INTERVAL

POSITION 2: A FIRST SYMBOL ARRIVES IN THE SECOND SYMBOL INTERVAL

POSITION 3: A FIRST SYMBOL ARRIVES IN THE THIRD SYMBOL INTERVAL

POSITION 4: A FIRST SYMBOL ARRIVES IN THE FOURTH SYMBOL INTERVAL

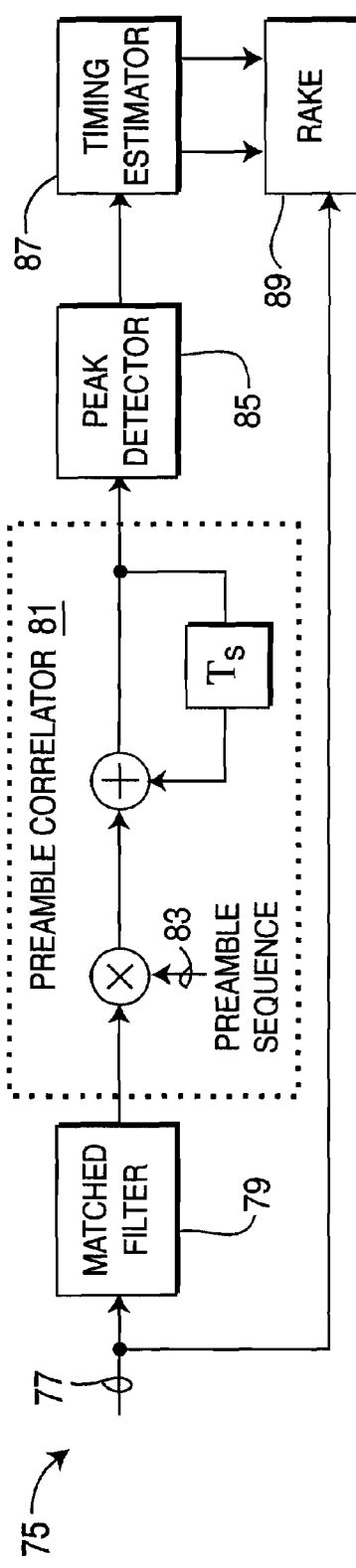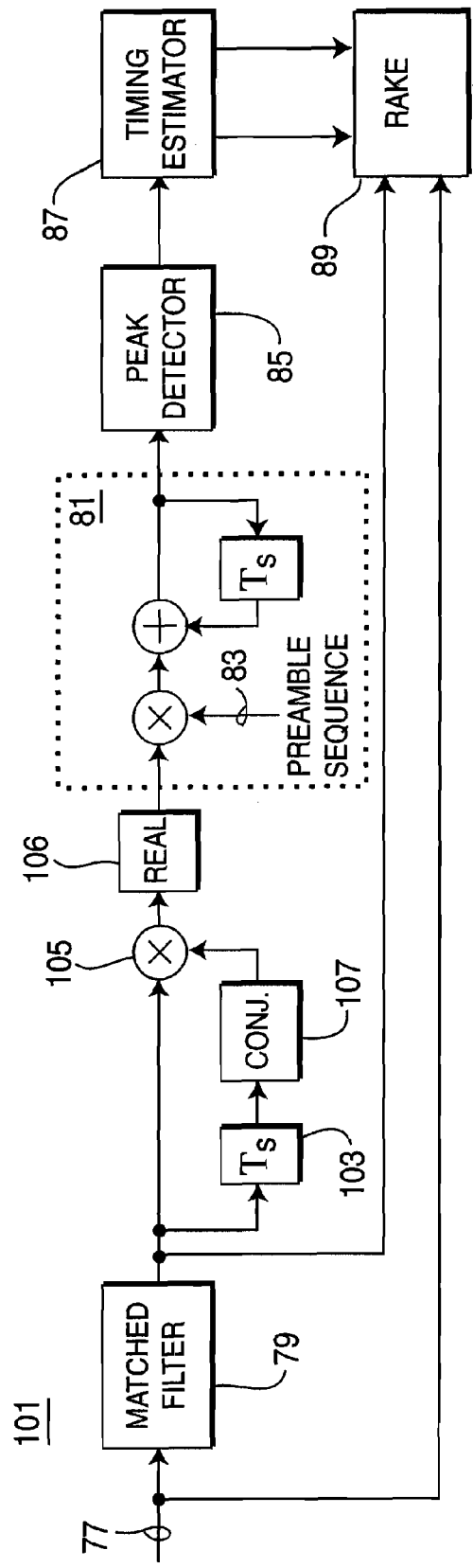
FIG. 6a PRIOR ART
FIG. 6b

| | CASE 1 | CASE 2 | CASE 3 | CASE 4 |
|---|---|---|---|---|
| s1 | 100.00 | 0.39 | 1.56 | 0.39 |
| s2 | 0.00 | 3.52 | 0.00 | 9.77 |
| s3 | 0.00 | 9.77 | 0.00 | 3.52 |
| s4 | 0.00 | 19.14 | 14.06 | 9.77 |
| s5 | 0.00 | 3.52 | 6.25 | 0.39 |
| s6 | 0.00 | 0.39 | 1.56 | 0.39 |
| s7 | 0.00 | 9.77 | 6.25 | 0.39 |
| s8 | 0.00 | 3.52 | 25.00 | 0.39 |
| s9 | 0.00 | 19.14 | 1.56 | 3.52 |
| s10 | 0.00 | 0.39 | 1.56 | 9.77 |
| s11 | 0.00 | 3.52 | 6.25 | 3.52 |
| s12 | 0.00 | 0.39 | 1.56 | 0.39 |
| s13 | 0.00 | 0.39 | 14.06 | 9.77 |
| s14 | 0.00 | 0.39 | 1.56 | 19.14 |
| s15 | 0.00 | 9.77 | 6.25 | 9.77 |
| s16 | 0.00 | 9.77 | 0.00 | 0.39 |

| SIGNATURE | P₀ | P₁ | P₂ | P₃ | P₄ | P₅ | P₆ | P₇ | P₈ | P₉ | P₁₀ | P₁₁ | P₁₂ | P₁₃ | P₁₄ | P₁₅ |
|---|---|---|---|---|---|---|---|---|---|---|---|---|---|---|---|---|
| | \|  | \|  | \|  | \|  | \|  | \|  | \|  | \| PREAMBLE SYMBOLS | \|  | \|  | \|  | \|  | \|  | \|  | \|  | \|  |
| 1 | A | A | A | A | A | A | A | A | A | A | A | A | A | A | A | A |
| 2 | A | -A | -A | -A | A | -A | A | A | -A | -A | -A | -A | A | -A | A | -A |
| 3 | A | -A | -A | -A | -A | -A | A | -A | -A | -A | -A | A | A | A | A | A |
| 4 | A | A | A | -A | -A | -A | A | -A | A | A | A | -A | -A | A | A | A |
| 5 | A | -A | A | A | A | A | A | -A | A | -A | A | A | -A | A | A | A |
| 6 | A | A | -A | -A | -A | -A | -A | A | A | -A | -A | -A | A | A | A | A |
| 7 | A | -A | A | A | A | A | A | A | A | -A | -A | A | A | A | -A | A |
| 8 | A | A | -A | A | -A | A | -A | A | A | -A | -A | -A | -A | -A | -A | -A |
| 9 | A | -A | A | -A | A | A | A | A | A | A | -A | -A | -A | -A | -A | -A |
| 10 | A | A | -A | -A | -A | -A | A | A | A | A | -A | A | A | A | A | A |
| 11 | A | -A | A | A | A | -A | A | A | -A | A | -A | -A | -A | A | -A | -A |
| 12 | A | A | A | -A | A | A | A | A | A | -A | A | -A | A | A | A | A |
| 13 | A | A | A | A | -A | A | -A | -A | A | A | A | A | -A | -A | -A | A |
| 14 | A | A | A | A | -A | A | A | -A | A | A | A | A | A | A | A | A |
| 15 | A | A | A | A | -A | A | A | -A | A | -A | -A | A | -A | A | A | -A |
| 16 | A | A | A | A | A | -A | A | A | -A | A | -A | A | A | A | -A | A |

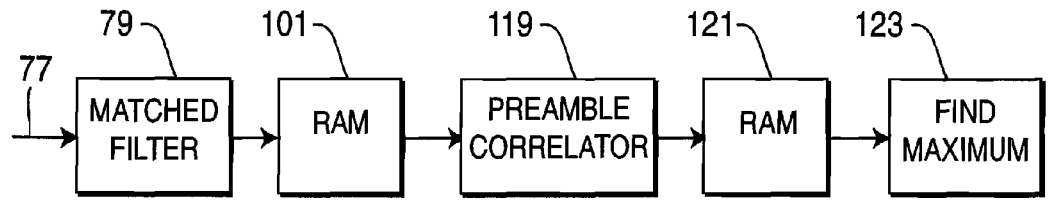
FIG. 12a
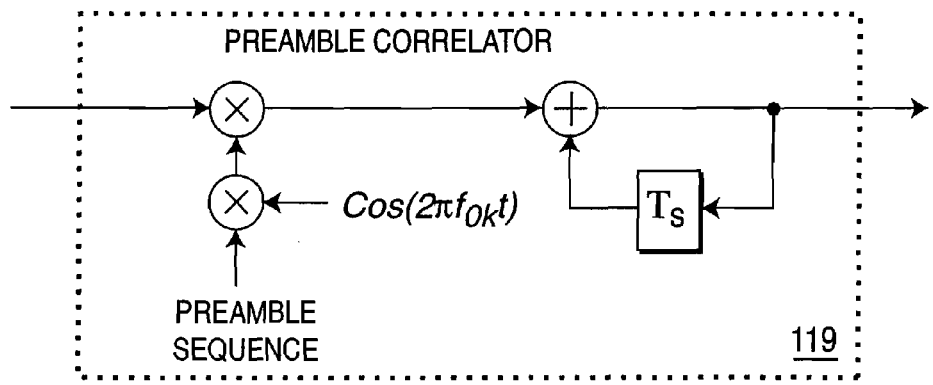
FIG. 12b
| k | 0...255... | | | | | | | | | | | | | | ...4095 |
|---|---|---|---|---|---|---|---|---|---|---|---|---|---|---|---|
| S(0,k) | A | A | B | B | A | -A | -B | B | A | -A | B | -B | A | A | -B | -B |
| S(1,k) | A | A | B | B | A | -A | -B | B | -A | A | -B | B | -A | -A | B | B |
| S(2,k) | A | -A | B | -B | A | A | -B | -B | A | A | B | B | A | -A | -B | B |
| S(3,k) | A | -A | B | -B | A | A | -B | -B | -A | -A | -B | -B | -A | A | B | -B |
| S(4,k) | A | A | B | B | -A | A | B | -B | A | -A | B | -B | -A | -A | B | B |
| S(5,k) | A | A | B | B | -A | A | B | -B | -A | A | -B | B | A | A | -B | -B |
| S(6,k) | A | -A | B | -B | -A | -A | B | B | A | A | B | B | -A | A | B | -B |
| S(7,k) | A | -A | B | -B | -A | -A | B | B | -A | -A | -B | -B | A | -A | -B | B |
| S(8,k) | A | A | -B | -B | A | -A | B | -B | A | -A | -B | B | A | A | B | B |
| S(9,k) | A | A | -B | -B | A | -A | B | -B | -A | A | B | -B | -A | -A | -B | -B |
| S(10,k) | A | -A | -B | B | A | A | B | B | A | A | -B | -B | A | -A | B | -B |
| S(11,k) | A | -A | -B | B | A | A | B | B | -A | -A | B | B | -A | A | -B | B |
| S(12,k) | A | A | -B | -B | -A | A | -B | B | A | -A | -B | B | -A | -A | -B | -B |
| S(13,k) | A | A | -B | -B | -A | A | -B | B | -A | A | B | -B | A | A | B | B |
| S(14,k) | A | -A | -B | B | -A | -A | -B | -B | A | A | -B | -B | -A | A | -B | B |
| S(15,k) | A | -A | -B | B | -A | -A | -B | -B | -A | -A | B | B | A | -A | B | -B |
FIG. 13

| | S(i,k) | | | |
|---|---|---|---|---|
| | A | -A | B | -B |
| M(i,k-1) A | A | -A | B = jA | -B = -jA |
| -A | -A | A | -B = -jA | B = jA |
| B | B = jA | -B = -jA | -A | A |
| -B | -B = -jA | B = jA | A | -A |

FIG. 14

| ORIG. | A | -A | B | -B | A | A | -B | -B | A | A | B | B | A | -A | -B | B |
|---|---|---|---|---|---|---|---|---|---|---|---|---|---|---|---|---|
| CODED | A | -A | -jA | -A | -A | -A | jA | A | A | A | jA | -A | -A | A | -jA | A |

FIG. 15

| k | 0...255... | | | | | | | | | | | | | | | |
|---|---|---|---|---|---|---|---|---|---|---|---|---|---|---|---|---|
| S(0,k) | A | A | B | -A | -A | A | -B | A | A | -A | -B | -A | -A | -A | B | A |
| S(1,k) | A | A | B | -A | -A | A | -B | A | -A | -A | B | -A | A | -A | -B | A |
| S(2,k) | A | -A | -B | -A | -A | -A | B | A | A | A | B | -A | -A | A | -B | A |
| S(3,k) | A | -A | -B | -A | -A | -A | B | A | -A | A | -B | -A | A | A | B | A |
| S(4,k) | A | A | B | -A | -A | A | B | A | A | -A | -B | -A | A | -A | -B | A |
| S(5,k) | A | A | B | -A | A | A | B | A | -A | -A | B | -A | -A | -A | B | A |
| S(6,k) | A | -A | -B | -A | A | -A | -B | A | A | A | B | -A | -A | A | B | A |
| S(7,k) | A | -A | -B | -A | A | -A | -B | A | -A | A | -B | -A | -A | A | -B | A |
| S(8,k) | A | A | -B | -A | -A | A | B | A | A | -A | B | -A | -A | -A | -B | A |
| S(9,k) | A | A | -B | -A | -A | A | B | A | -A | -A | -B | -A | A | -A | B | A |
| S(10, | A | -A | B | -A | -A | -A | -B | A | A | -A | B | -A | A | A | B | A |
| S(11, | A | -A | B | -A | -A | -A | -B | A | -A | A | B | -A | A | A | -B | A |
| S(12, | A | A | -B | -A | A | A | -B | A | -A | B | -A | A | -A | B | A |
| S(13, | A | A | -B | -A | A | A | -B | A | -A | -A | -B | -A | -A | -A | -B | A |
| S(14, | A | -A | B | -A | A | -A | B | A | A | A | -B | -A | A | A | -B | A |
| S(15, | A | -A | B | -A | A | -A | B | A | -A | A | B | -A | A | A | B | A |

FIG. 16

RANDOM ACCESS CHANNEL PREAMBLE

CROSS REFERENCE TO RELATED APPLICATIONS

This application is a continuation of U.S. patent application Ser. No. 11/305,283 filed on Dec. 16, 2005, now U.S. Pat. No. 7,529,210; which is a continuation of U.S. patent application Ser. No. 09/868,209, filed on Jun. 14, 2001; which is a Section 371 National Phase of Application No. PCT/US99/29504 filed on Dec. 14, 1999; which claims the benefit of U.S. Provisional Application No. 60/129,177 filed Apr. 14, 1999; U.S. Provisional Application No. 60/125,418 filed Mar. 22, 1999; U.S. Provisional Application No. 60/116,284 filed Jan. 19, 1999 and U.S. Provisional Application No. 60/112,299 filed Dec. 14, 1998, which are incorporated by reference as if fully set forth.

FIELD OF INVENTION

The present invention relates generally to transmission systems and methods for binary modulated signals. More specifically, the invention relates to a CDMA transmission system for transmitting a modulated signal in a mobile communications environment where transmitting range varies.

BACKGROUND

A communication system has one principle function, to transmit information from a source to a destination. The information generated by the source is typically an electrical signal that changes with time.

The information signal is transmitted from the source to the destination over an appropriate medium, usually referred to as a channel. One method of altering the information signal to match the characteristics of the channel is referred to as modulation. The recovery of the information-bearing signal is called demodulation. The demodulation process converts the transmitted signal using the logical inverse of the modulation process. If the transmission channel were an ideal medium, the signal at the destination would be the same as at the source. However, the reality is that during the transmission process, the signal undergoes many transformations which induce distortion. A receiver at the destination must recover the original information by removing all other effects.

Most communications currently rely upon the conversion of an analog source into a digital domain for transmission and ultimately reconversion to analog form depending upon the type of information conveyed. The simplest digital representation is where the information in any bit time is a binary value, either a 1 or a 0. To extend the possible range of values that the information can be, a symbol is used to represent more than two possible values. Ternary and quaternary symbols take on three and four values respectively. The varying values are represented by integers, positive and negative, and are usually symmetric. The concept of a symbol allows a greater degree of information since the bit content of each symbol dictates a unique pulse shape. Depending upon the number of levels of a symbol, an equal number of unique pulse or wave shapes exist. The information at the source is converted into symbols which are modulated and transmitted through the channel for demodulation at the destination.

The normal processes of a communication system affect the information in a calculable and controllable manner. However, during the transmission from a source to a destination, a component that cannot be calculated is noise. The addition of noise in a digital transmission corrupts the signal and increases the probability of errors. Other signal corruptions that manifest themselves are multipath distortions due to natural terrain and manmade structures, and distances the signals travel which affect signal timing. The communication system needs to define the predictable transformations that the information signal encounters and during reception of the information the receiver must possess the means to analyze the predictable transformations that have occurred.

A simple binary transmission system could use a positive pulse for a logical 1 and a negative pulse for a logical 0, with rectangular pulse shapes transmitted by the source. The pulse shape received at the destination undergoes the aforementioned transformations including noise and other distortions.

To minimize the probability of error, the response of a filter used at the receiver is matched to the transmitter pulse shape. One optimal receiver, known as a matched filter, can easily determine whether a transmitted pulse shape is a logical 1 or 0 and is used extensively for digital communications. Each matched filter is matched to a particular pulse shape generated by the transmitter corresponding to a symbol. The matched filter is sampled at the symbol rate to produce an output that correlates the input pulse shape with the response of the filter. If the input is identical to the filter response, the output will produce a large value representing the total energy of the signal pulse. The output usually is a complex quantity that is relative to the input. The optimum performance of the matched filter depends on a precise replica of the received signal pulses which requires accurate phase synchronization. Phase synchronization can easily be maintained with the use of a phase-locked loop (PLL). Pulse synchronization, however, is a problem for matched filters. If the pulses are not time-aligned to one symbol time, intersymbol interference (ISI) appears.

An example prior art communication system is shown in FIG. 1. The system employs a technique known as code division multiplexing, or more commonly, as code-division multiple access or CDMA.

CDMA is a communication technique in which data is transmitted within a broadened band (spread spectrum) by modulating the data to be transmitted with a pseudo-noise signal. The data signal to be transmitted may have a bandwidth of only a few thousand Hertz distributed over a frequency band that may be several million Hertz. The communication channel may be used simultaneously by m independent subchannels. For each subchannel, all other subchannels appear as noise.

As shown, a single subchannel of a given bandwidth is mixed with a unique spreading code which repeats a predetermined pattern generated by a wide bandwidth, pseudo-noise (pn) sequence generator. These unique user spreading codes are typically orthogonal to one another such that the cross-correlation between the spreading codes is approximately zero. A data signal is modulated with the pn sequence to produce a digital spread spectrum signal. A carrier signal is then modulated with the digital spread spectrum signal, to establish a forward-link, and transmitted. A receiver demodulates the transmission and extracts the digital spread spectrum signal. The transmitted data is reproduced after correlation with the matching pn sequence. When the spreading codes are orthogonal to one another, the received signal can be correlated with a particular user signal related to the particular spreading code such that only the desired user signal related to the particular spreading code is enhanced while the other signals for all other users are not enhanced. The same process is repeated to establish a reverse-link.

If a coherent modulation technique such as phase shift keying (PSK) is used for a plurality of subscriber units, whether stationary or mobile, a global pilot is continuously transmitted by the base station for synchronizing with the subscriber units. The subscriber units synchronize with the base station at all times and use the pilot signal information to estimate channel phase and magnitude parameters.

For the reverse-link, a common pilot signal is not feasible. For initial acquisition by the base station to establish a reverse-link, a subscriber unit transmits a random access packet over a predetermined random access channel (RACH). The random access packet serves two functions. The first function is for initial acquisition when the subscriber unit is transmitting and the base station has to receive the transmission quickly and determine what is received. The RACH initiates the reverse-link to the base station. The second use of random access packets is for communicating lower data rate information rather than consuming a dedicated continuous voice communication channel. Small amounts of data such as credit card information are included in the data portion of the random access packet instead of call placing data. The information when sent to the base station can be forwarded to another communicating user. By using the random packet data portion to transport addressing and data, available air resources are not burdened and can be efficiently used for higher data rate communications.

A random access packet comprises a preamble portion and a data portion. The data may be transmitted in parallel with the preamble. In the prior art, the random access channel typically uses quadrature phase shift keying (QPSK) for the preamble and data.

The base station examines the received preamble for the unique spreading codes. Each symbol of the RACH preamble is spread with a pn sequence. Using matched filters, the base station searches continuously for those codes that correlate. The data portion contains instructions for a desired service. The base station demodulates the data portion to determine what type of service is requested such as a voice call, fax, etc. The base station then proceeds by allocating a specific communication channel for the subscriber unit to use for the reverse-link and identifying the spreading codes for that channel. Once the communication channel is assigned, the RACH is released for other subscriber units to use. Additional RACHs afford quicker base station acquisition by eliminating possible collisions between subscriber units simultaneously initiating calls.

Without a subscriber unit pilot signal providing pulse synchronization in the reverse-link, acquisition of the RACH from a mobile subscriber unit is difficult if a coherent coding technique such as PSK is used compounded with transmitting range ambiguity. Since a mobile subscriber unit is synchronized with the base station, the RACH preamble is transmitted at a predefined rate.

An example prior art preamble signature is defined by 16 symbols. A table of sixteen coherent RACH preamble signatures is shown in FIG. 2. Since each symbol is a complex quantity and has a pulse shape comprising 256 chips of the spreading pn sequence, each signature comprises 4096 chips. The complete RACH preamble signature is transmitted at a chipping rate of 4096 chips per millisecond or 0.244 chips per microsecond.

From the global pilot signal, each subscriber unit receives frame boundary information. Depending upon the distance from the base station to a subscriber unit, the frame boundary information suffers a forward-link transmission delay. A RACH preamble transmitted in the reverse direction suffers an identical transmission delay. Due to the propagation delay, the perceived arrival time of a RACH preamble at a base station is:

$$\Delta t = \frac{2(\text{distance})}{C}, \text{ where } C = 3.0 \times 10^8 \text{ m/s.} \quad \text{Equation 1}$$

Due to this inherent delay, the range ambiguity for a subscriber unit varies according to distance. At 100 m, the effect is negligible. At 30 km, the delay may approach the transmission time of 4 symbols. Table 1 illustrates the effect of round trip propagation delay.

TABLE 1

Effect of range ambiguity

| range (km) | round trip time (msec) | chip value | symbol interval |
|---|---|---|---|
| 0 | 0 | 0 | 1 |
| 5 | 0.033 | 137 | 1 |
| 10 | 0.067 | 273 | 2 |
| 15 | 0.100 | 410 | 2 |
| 20 | 0.133 | 546 | 3 |
| 25 | 0.167 | 683 | 3 |
| 30 | 0.200 | 819 | 4 |

The first column is the distance in km between a mobile subscriber unit and a given base station. The second column is the round trip propagation delay of the RF signal in milliseconds from the base station to a subscriber unit and back. The third column shows the chip clocking position of the matched filter at the base station with time 0 referenced at the start of a transmitted frame boundary. The value represents when a first chip is received from a subscriber unit referencing the beginning of a frame boundary. The fourth column shows the expected location of the first output of the matched filter which occurs after assembling 256 received chips; (reference being made at the start of a frame boundary). A symbol may be output during any one of the first four symbol intervals depending on subscriber unit distance.

Since the base station is not synchronized with the subscriber unit and does not have a carrier reference, the base station does not know where in a received chip sequence the beginning of a RACH preamble symbol begins. The matched filter must correlate a total of 256 chips corresponding to a valid symbol pulse shape. As one skilled in this art knows, as the chips are received, the matched filter assembles 256 chips to produce a first output representative of the pulse shape. Consecutive outputs from the matched filter are generated for each subsequently received chip.

The mobile subscriber unit transmits the preamble part first to access the RACH from the base station. One from among sixteen signatures is randomly selected and one from among five time-offsets is randomly chosen to account for the range ambiguity during transmission. The mobile subscriber unit constantly receives a frame boundary broadcast from the base station. To request a RACH, the mobile subscriber unit transmits a random burst with an n H 2 ms time-offset (where n=0, 1, . . . 4) relative to the received frame boundary as shown in FIG. 3. The time-offset (value of n) is chosen at random at each random access attempt.

Four received preamble signatures, a, b, c, and d are shown in FIGS. 4a-d received at the base station. Each signature arrives at one symbol duration (0.0625 ms) later due to round trip delay, with each signature representing a different distance between the base station and mobile subscriber unit. Only sixteen consecutive symbols have signal components, the other matched filter outputs represent noise. It is known that range ambiguity will destroy the orthogonality among signatures and degrade performance. The possibility exists that the base station receiver could confuse any combination from a possible nineteen outputs from the matched filter as an incorrect signature.

Accordingly, there exists a need for a CDMA transmission and detection scheme that is accurate notwithstanding communication distance and the effects of Doppler.

SUMMARY

The present invention relates to a detector that detects a transmitted digital signature using the energy output from a matched filter in conjunction with normal correlation detection. The energies are tabulated according to an anticipated signature pattern for variable transmission distances. The tabulation accounts for expected round trip transmission delays and allows processing of the accumulated symbols to derive a correct signature whether coherent or non-coherent signature coding is used and whether or not multiple Doppler channels are present. Alternative embodiments of the invention include new schemes for differentially encoding RACH preamble signatures.

Objects and advantages of the system and the method will become apparent to those skilled in the art after reading a detailed description of the preferred embodiment.

BRIEF DESCRIPTION OF THE DRAWING(S)

FIG. 2 is a table of sixteen coherent RACH signatures.

FIG. 6A is a prior art system diagram of a random access channel preamble detector.

FIG. 6B is a random access channel preamble detector made in accordance with the present invention.

FIG. 10 is a table of sixteen non-coherent RACH signatures.

FIG. 12A is a system diagram of a coherent RACH preamble detector correcting for multiple Doppler channels.

FIG. 12B is a detailed diagram of a preamble correlator.

FIG. 13 is an alternative embodiment of the present invention.

FIG. 14 is the encoding rule for the alternative embodiment of the present invention.

FIG. 15 is an uncoded sequence and its transformation into a differentially coded sequence.

FIG. 16 is a transmitted signature of the sequences of FIG. 15.

DETAILED DESCRIPTION OF THE PREFERRED EMBODIMENT(S)

Figure 1:
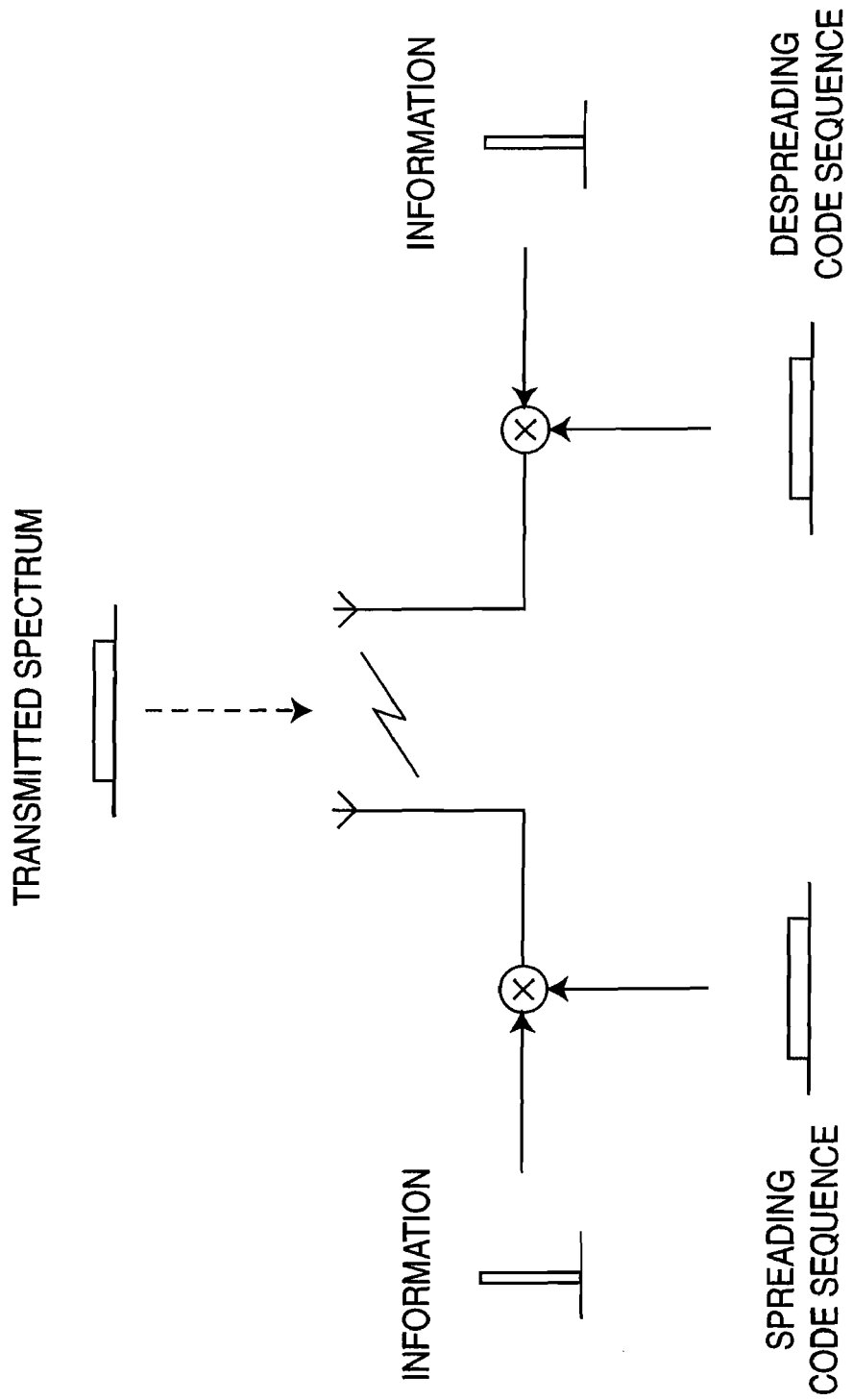
FIG. 1 is a simplified block diagram of a prior art CDMA communication system.
Figure 3:
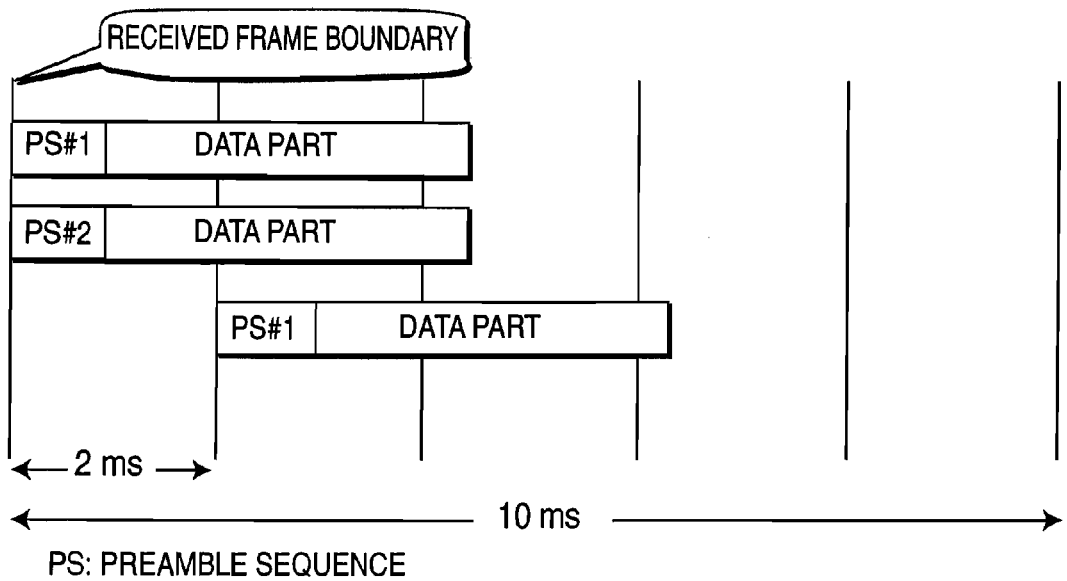
FIG. 3 is a timing diagram showing transmission timing for parallel RACH attempts.
Figure 4A:
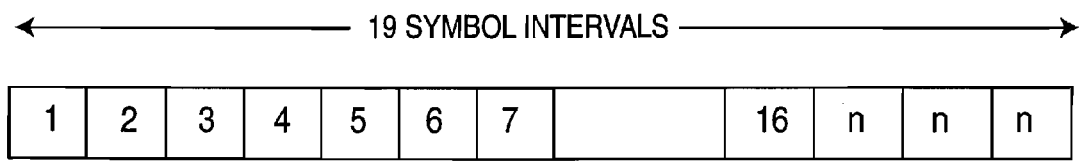
FIG. 4A is a timing diagram showing a 16 symbol RACH preamble signature received during the first symbol interval period.
Figure 4B:
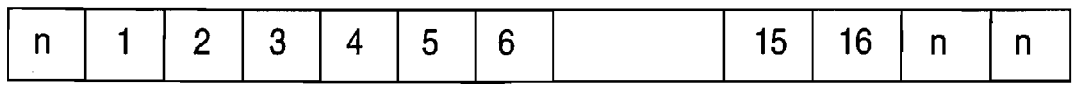
FIG. 4B is a timing diagram showing a 16 symbol RACH preamble signature received during the second symbol interval period.
Figure 4C:
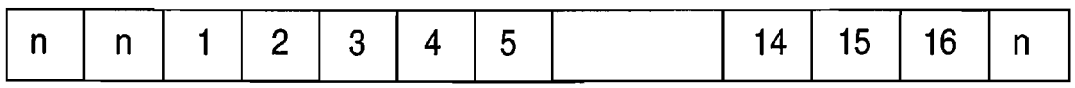
FIG. 4C is a timing diagram showing a 16 symbol RACH preamble signature received during the third symbol interval period.
Figure 4D:
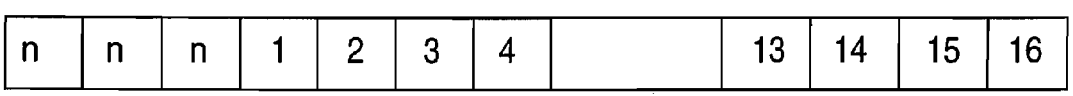
FIG. 4D is a timing diagram showing a 16 symbol RACH preamble signature received during the fourth symbol interval period.

The preferred embodiment will be described with reference to the drawing figures where like numerals represent like elements throughout.

Figure 5:
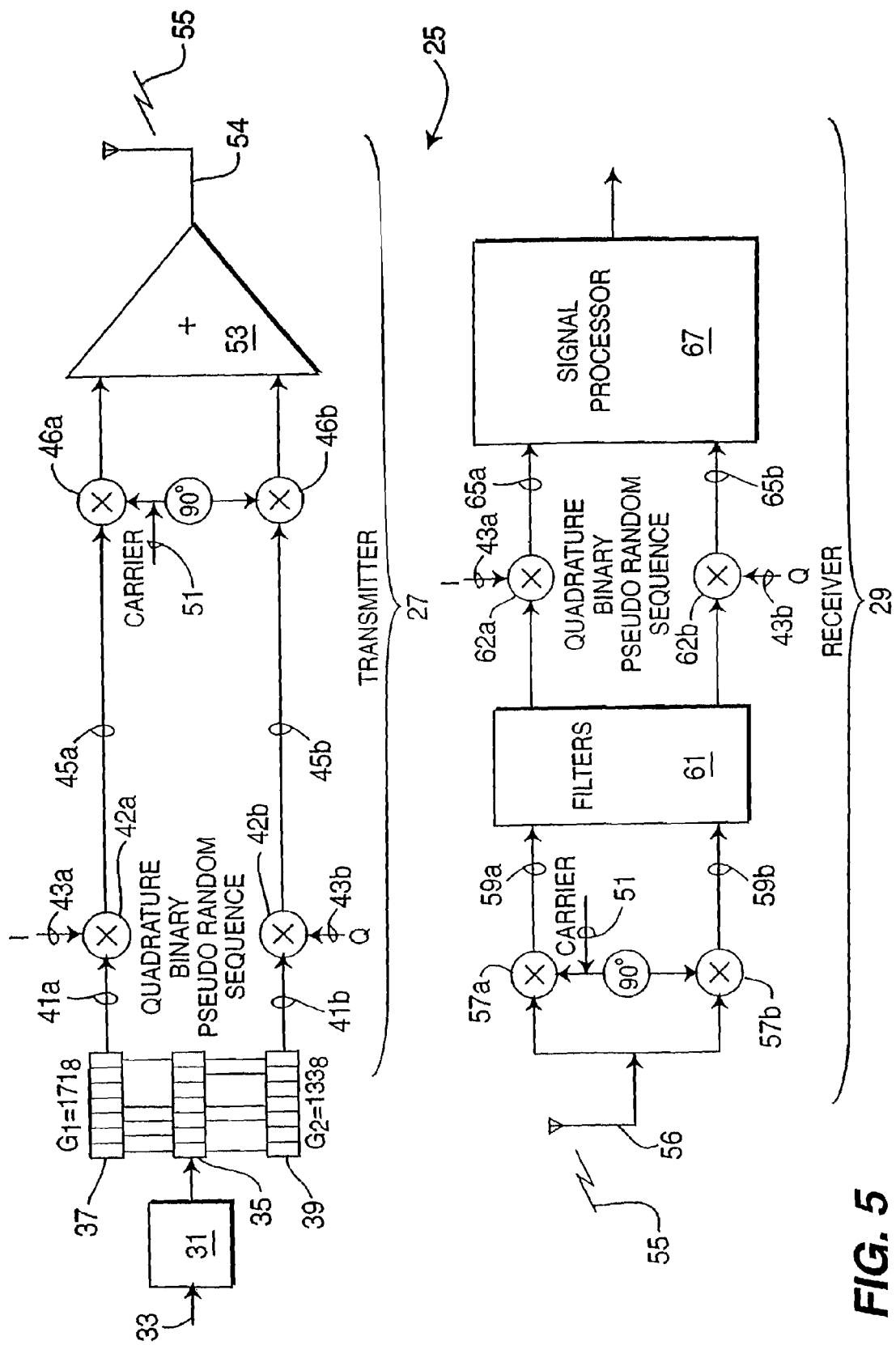
FIG. 5 is a detailed block diagram of a CDMA communication system.

A CDMA communication system 25 as shown in FIG. 5 includes a transmitter 27 and a receiver 29, which may reside in either a base station or a mobile subscriber unit. The transmitter 27 includes a signal processor 31 which encodes voice and nonvoice signals 33 into data at various rates, e.g. 8 kbps, 16 kbps, 32 kbps, 64 kbps or other rates as desired for the particular application. The signal processor 31 selects a rate in dependence upon the type of signal, service or in response to a set data rate.

By way of background, two steps are involved in the generation of a transmitted signal in a multiple access environment. First, the input data 33 which can be considered a bi-phase modulated signal is encoded using a forward error-correction (FEC) encoder 35. For example, if a R=½ convolution code is used, the single bi-phase modulated data signal becomes bivariate or two bi-phase modulated signals. One signal is designated the in-phase channel I 41a. The other signal is designated the quadrature channel Q 41b. A complex number is in the form a+bj, where a and b are real numbers and $j^2=-1$. Bi-phase modulated I and Q signals are usually referred to as QPSK.

In the second step, the two bi-phase modulated data or symbols 41a, 41b are spread with a complex pseudo-noise (pn) sequence 43a, 43b. The QPSK symbol stream 41a, 41b is multiplied by a unique complex pn sequence 43a, 43b. Both the I and Q pn sequences 43a, 43b are comprised of a bit stream generated at a much higher rate, typically 100 to 200 times the symbol rate. The complex pn sequence 43a, 43b is mixed at mixers 42a, 42b with the complex-symbol bit stream 41a, 41b to produce the digital spread signal 45a, 45b. The components of the spread signal 45a, 45b are known as chips having a much smaller duration. The resulting I 45a and Q 45b spread signals are upconverted to radio frequency by mixers 46a, 46b, and are combined at the combiner 53 with other spread signals (channels) having different spreading codes, mixed with a carrier signal 51 to upconvert the signal to RF, and radiated by antenna 54 as a transmitted broadcast signal 55. The transmission 55 may contain a plurality of individual channels having different data rates.

The receiver 29 includes a demodulator 57a, 57b which downconverts the received revision of transmitted broadband signal 55 at antenna 56 into an intermediate carrier frequency 59a, 59b. A second down conversion at the mixers, not pictured, reduces the signal to baseband. The QPSK signal is then filtered by the filters 61 and mixed at mixers 62a, 62b with the locally generated complex pn sequence 43a, 43b which matches the conjugate of the transmitted complex code. Only the original waveforms which were spread by the same code at the transmitter 27 will be effectively despread. All other received signals will appear as noise to the receiver 29. The data 65a, 65b is then passed to a signal processor 67 where FEC decoding is performed on the convolutionally encoded data.

After the signal has been received and demodulated, the baseband signal is at the chip level. Both the I and Q components of the signal are despread using the conjugate of the pn sequence used during spreading, returning the signal to the symbol level.

To establish a reverse-link from a mobile subscriber unit to a base station, the mobile subscriber unit transmits a random access packet transported on a RACH. The transmission of the RACH is similar to what was described except the RACH does not undergo FEC. There may also be more than one RACH employed in the communication system 25.

A table showing 16 possible coherent PSK coded RACH 71 preamble signatures 73 is shown in FIG. 2. Each signature comprises 16 symbols. Each symbol A is a complex number A=1+j. A discussion of the coding methods and complex numbers is beyond the scope of this disclosure and is known to those skilled in this art.

A prior art coherent RACH 71 detector 75 is shown in FIG. 6A. After the receiver 29 demodulates the RACH 71 carrier, the demodulated signal 77 is input to a matched filter 79 for despreading the RACH preamble 73. The output of the matched filter 79 is coupled to a preamble correlator 81 for correlating the RACH preamble 73 with a known preamble pn sequence representing the preamble code 83. The output of the preamble correlator 81 will have peaks 85 corresponding to the timing 87 of any received random access burst using the specific preamble code 83. The estimated timing 87 can then be used in an ordinary RAKE 89 combiner for the reception of the data part of the RACH 71 burst. Although this detector 75 may work well under ideal conditions with the coherent PSK coded preamble signatures 73 shown in FIG. 2, its operation may be adversely affected due to range ambiguity and the presence of Doppler.

In a first embodiment of the present invention, non-coherent detection can be utilized. In this embodiment, the coherent RACH preamble signatures 73 shown in FIG. 2 are differentially encoded, (i.e., differential phase shift keyed (DPSK) processed). Accordingly, the coherent preamble signatures 73 are first translated into incoherent, DPSK coded signals prior to transmission, and then differentially decoded after reception.

The method of translating the coherent symbols into non-coherent symbols is performed in accordance with the following steps, (where i=rows and j=columns). First:

if $S_{old}(i,1)=-A$; multiply all j corresponding to i by −1.     Equation 2

For example, for signature 4 (i=4) shown in FIG. 2

After the first step, the old preamble signatures would consist of the original undisturbed signatures (1, 3, 5, 8, 9, 11, 12 and 13) and the signatures multiplied by −1 (2, 4, 6, 7, 10, 14, 15 and 16).

The second step of the translation process translates each consecutive symbol of a preamble signature 73

$S_{new}(i,j)=A$ if: $S_{old}(i,j)=S_{new}(i,j-1)$     Equation 3

$S_{new}(i,j)=-A$ if: $S_{old}(i,j) S_{new}(i,j-1)$     Equation 4

Continuing with the example, for signature 4 (i=4):
$S_{old}$ (4,2) $S_{new}$ (4, 2-1)
  −A A therefore; $S_{new}$ (4, 2)=−A The remainder of the DPSK coding is performed for each consecutive symbol of a given preamble signature 73. The process translates all 16 preamble signatures 73 into the differential preamble signatures 97 shown in FIG. 10. The DPSK translation may be calculated and loaded into firmware as part of the mobile subscriber unit or may be calculated when initiating a call depending upon the sophistication of the base station receiver. For the DPSK preamble signatures, the same process as hereinbefore described for coherent processing may performed except that the received signal must be recovered by differential decoding before correlating with the preamble signatures.

A RACH detector 101 made in accordance with present invention 95 is shown in FIG. 6B. As previously described with reference to the prior art receiver 75, the received RACH 77 is demodulated and coupled to the input of the matched filter 79. The output of the matched filter 79 is coupled to the RAKE 89, to a time delay 103 and a first mixer 105. Each received signature 97 is delayed by one symbol length, which is 256 chips. The output of the time delay 103 is coupled to conjugate processor 107 which converts the received symbol to its complex conjugate. The output of the complex conjugate processor 107 is coupled to the first mixer 105 where the real part of the complex number is selected 106 and multiplied by the signature symbol and output to the preamble correlator 81. The preamble correlator 81 correlates a possible signature with a sequence of outputs. This sum is compared to a threshold in the peak detector 85 and if it exceeds the threshold by the end of the sixteenth symbol, it is determined that a signature has been detected. Since there are 16 computations, one for each signature, there may be more than one accumulation that exceeds its threshold for a given sample time. In this case, the accumulation with the largest value is selected as correct. The estimated timing 87 can then be used in an ordinary RAKE 89 combiner for the reception of the data part of the RACH 71 burst.

In accordance with a second embodiment of the present invention, the energy from each output of the RACH detector matched filter 79 is computed. Although the matched filter 79

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 4 | −A | A | −A | A | −A | −A | −A | −A | −A | A | −A | A | −A | A | A | A | multiply by −1

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 4 | A | −A | A | −A | A | A | A | A | A | −A | A | −A | A | −A | −A | −A | is typically sampled at the chipping rate, it may be oversampled at twice or four times the chipping rate, (or even higher). In this embodiment, the chipping rate is 4.096 million chips per second, or one chip every 0.244Φs.

Figure 7A:
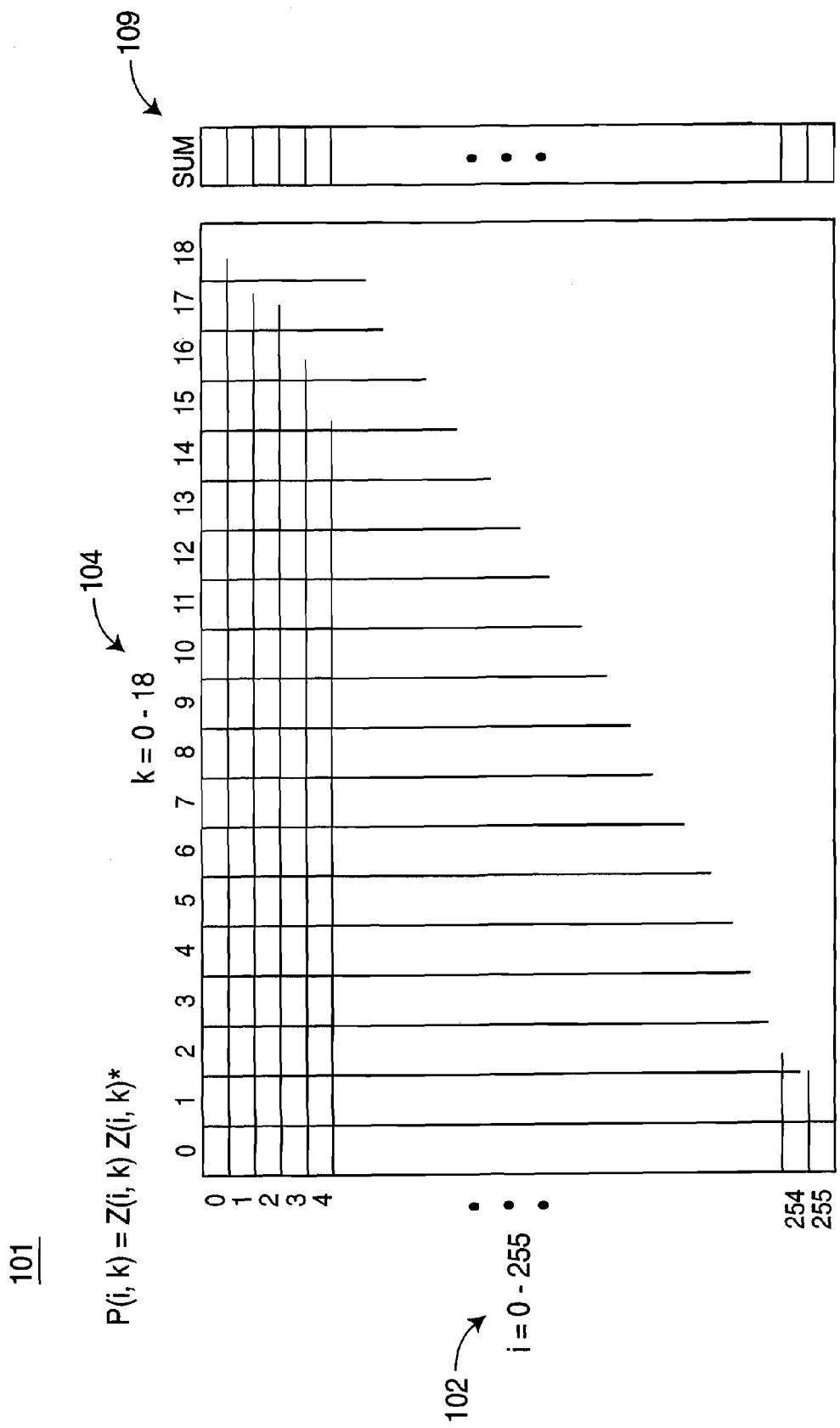
FIG. 7A is a diagram of the symbol memory matrix.

Shown in FIG. 7A is a memory matrix 101 stored in RAM 100 where the value of the energy computed for each symbol output from the matched filter 79 is stored. The matrix 101 is arranged to store all possible delayed symbol values corresponding to base station to subscriber unit transmission distances ranging from 100 m to 30 km. The matrix 101 consists of 256 rows (0-255) 102 and 19 columns (0-18) 104 representing the total number of chips transmitted during a RACH preamble signature. If the subscriber unit were located adjacent to the base station where propagation delay would be negligible, the first symbol would be output after 256 chips were received or at P(255,0). If the subscriber unit were located at 30 km, the first symbol would be output after 819 chips were received or at approximately P(54,4). Regardless of transmission distance, every 256 chips later would produce another symbol, and so on, thereby completing an entire row. Since sixteen symbols define a preamble signature, the matrix 101 allows for three additional symbol outputs to anticipate range ambiguity, (shown in FIG. 4, as will be explained in greater detail hereinafter). Once the matrix 101 is populated, it includes all samples of interest for the mobile subscriber unit out to a range of 30 km.

Each output 97 from the matched filter 79 is a complex number:

$$z(ik)=x(ik)+jy(i,k); \text{ where } i=0 \text{ to } 255 \text{ and } k=0 \text{ to } 18. \quad \text{Equation 5}$$

The value for instantaneous energy, which is the sum of the squares of real and imaginary parts of each output, is computed as:

$$P(i,k)=z(i,k)\ z(i,k)^*=x^2+y^2, \quad \text{Equation 6}$$

and stored within the matrix 101.

Because a preamble signature is from a set of 16 symbols, each with a pre-specified chip pattern, a match filter output is expected to produce a larger than average output 16 times, each larger value separated from the previous one by 256 chips. The combined output is the sum of the matched filter outputs speed by 256 chips. One problem that must be overcome is that the first matched filter output does not automatically occur within the first 256 chips. It can occur later, as shown in Table 1, depending upon the distance between the mobile subscriber unit and the base station.

When a preamble signature is present, its corresponding matched filter outputs will fill 16 of the 19 elements of one of the 256 rows 102. For each row, a complete preamble signature may be detected where the value of total energy summed for the row exceeds a predetermined threshold.

Figure 7B:
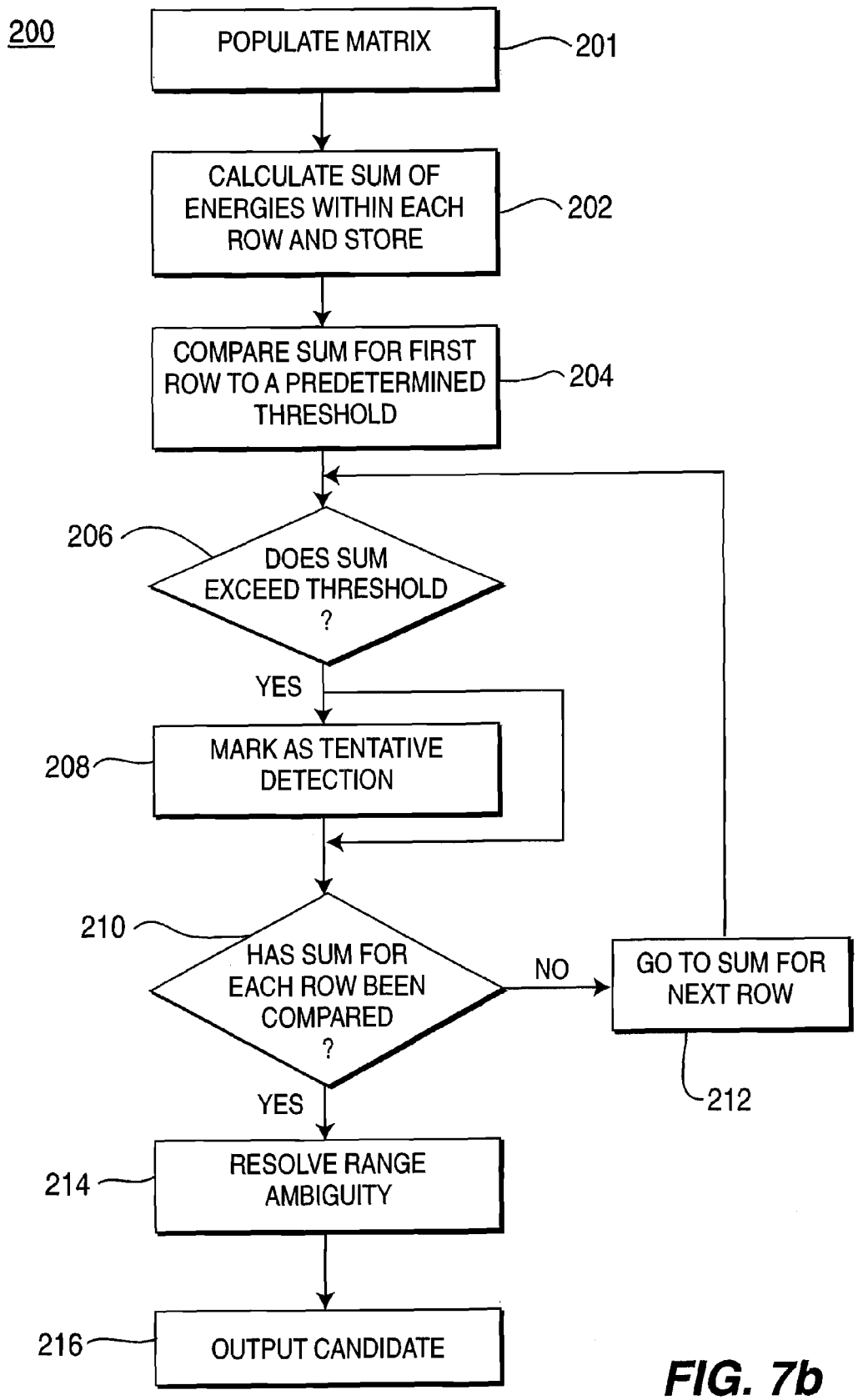
FIG. 7B is a flow diagram of the procedure for tentatively detecting preamble signatures.

Referring to FIG. 7B, the procedure 200 for tentatively detecting preamble signatures is shown. Once the matrix 101 is populated (step 201), the value of energy for each row is summed 109 and similarly stored (step 202). For those rows where the sum exceeds a predetermined threshold, the row is considered to be a "tentative detection". The sum for the first row is compared to a predetermined threshold (step 204) to determine if the sum exceeds the threshold (step 206). If so, the row is marked as a tentative detection (step 208). If each row has not been summed (step 210), the next row is retrieved (step 212) and the process is repeated (steps 206-210). Once all the rows have been summed, the range ambiguity on each tentative detection is resolved (step 214), (which will be described in greater detail hereinafter), and the candidates are output (step 216).

Figures 8, 9:
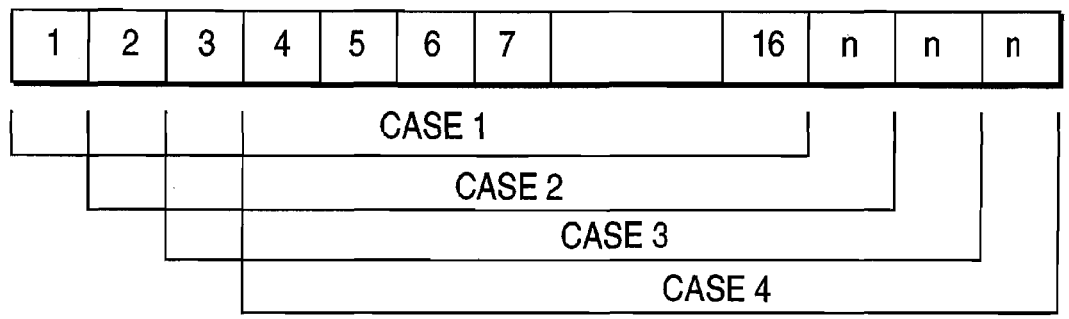
FIG. 8 is a table showing four possible combinations of received preamble signature symbols to resolve range ambiguity.
FIG. 9 is a table showing the relationship between orthogonality and range ambiguity.

As indicated above, due to the location of the mobile subscriber unit, range ambiguity is introduced whereby the preamble signature may not occur for up to four symbols. This range ambiguity must be resolved. Accordingly, for each row marked as a tentative detection, the value of the energy of the 16 consecutive positions within that row which produce the highest sum must be determined. Due to range ambiguity, four possible cases 1, 2, 3 and 4 are derived from a received version of a preamble signature. The four cases are shown in FIG. 8. In this example, signature 1 was transmitted and assembled from nineteen received symbols, forming one row of the memory matrix 101. For each case, sixteen consecutive symbols out of nineteen are correlated with each of the sixteen possible preamble signatures, resulting in 64 hypotheses. One of the 64 hypotheses will result in a signature having the greatest energy received. The greatest of the 64 hypotheses will occur in case 1 since case 1 has all consecutive symbols and does not include noise. Cases 2, 3 and 4 include symbols derived from noise components and will not correlate with one of the sixteen preamble signatures.

Figure 7C:
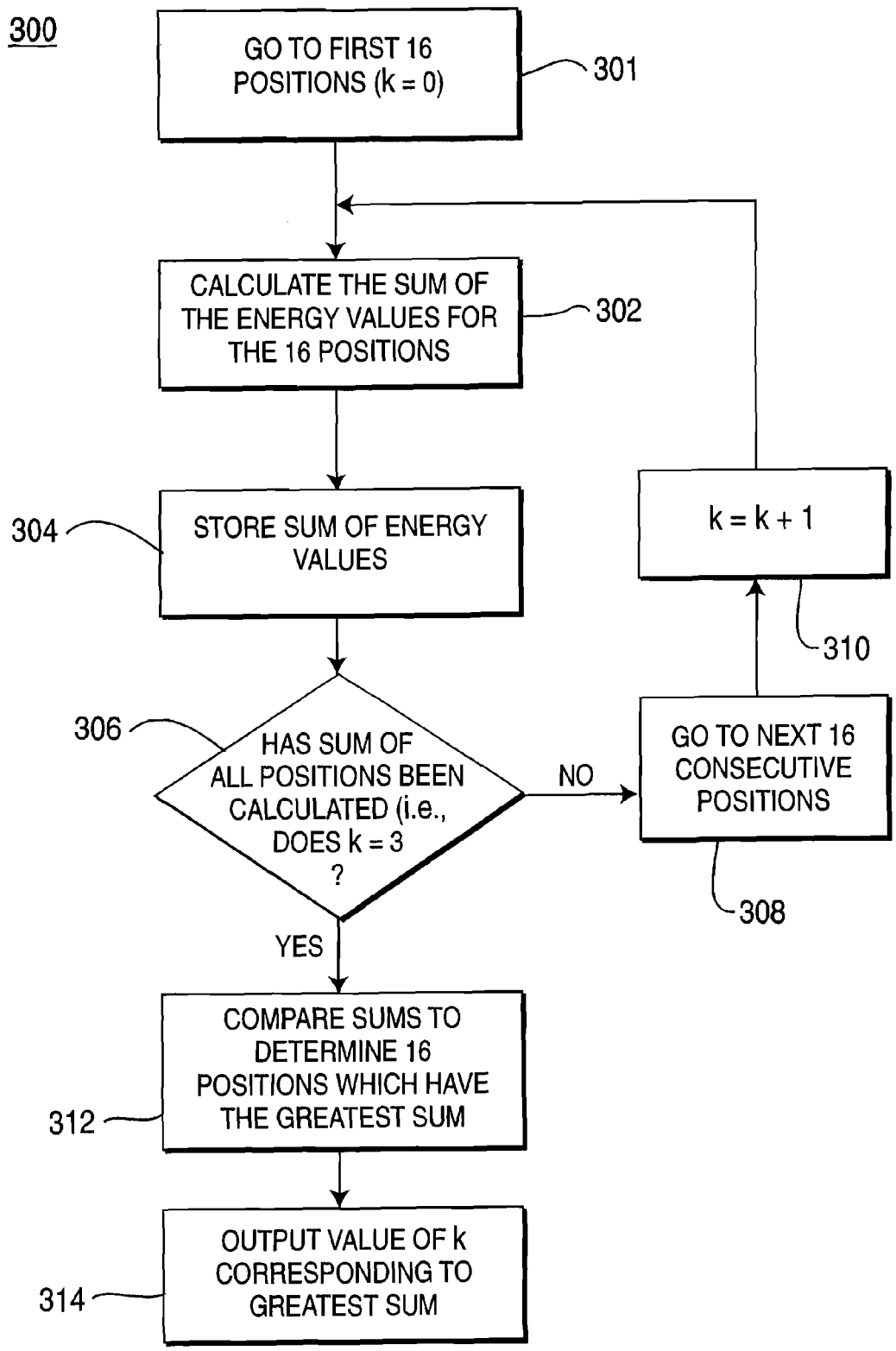
FIG. 7C is a flow diagram of the procedure for resolving range ambiguity.

Referring to FIG. 7C, the procedure 300 for resolving range ambiguity in accordance with the present invention is shown. As was described with reference to FIG. 8, each row comprises 19 total positions. Referring back to FIG. 7C, the values of the energy of the first 16 consecutive positions of a row considered to be a tentative detection are analyzed (step 301). The energy sum for the 16 positions is calculated (step 302) and then stored (step 304). If the sums of all positions within the row have not been calculated (step 306) the next 16 consecutive positions, corresponding to elements 2-17, are reviewed (step 308). The counter is then incremented (step 310) and the procedure is then repeated (step 302-306). Once the sums of all positions have been calculated, all of the sums are compared to determine if the 16 consecutive positions within the row that have the greatest sum (step 312). The system then outputs the value of the column (k) corresponding to the beginning of the 16 consecutive positions having the greatest sum (step 314). This is a selected candidate. This procedure is repeated for each tentative detection.

The process described with reference to FIG. 7C can be summarized in pseudo code as follows:

```
row i(i=0 to 255)
  sum(k)=0; k=0, 1, 2, 3
  for k=0 to 3, do
    sum(k)=sum(k)+P(i,n+k−1)
  next k
then;
  Select k for max sum(k)
  maxk=0
  max=sum(0)
  for k=1 to 3
  if sum(k)>max then
    max=sum(k)
    maxk=k
  next k
```

The selected candidates are compared with the output of a normal correlation detection process for coherent or incoherent PSK coding. The discussion of a normal correlation detection process is beyond the scope of this application and is well known to those skilled in this art.

Referring to FIG. 9, a table of the relationship between orthogonality and range ambiguity is shown. The first column is the signature with which a received signal correlates. The second though fifth columns are the correlation values of cases 1-4. The larger the correlation value, the better the received match to the received signal. A zero correlation value indicates the received symbol is orthogonal to the respective signature symbol. As can clearly be seen, orthogonality does not exist among the respective signatures for cases 2, 3 and 4.

The correlation values shown in FIG. 9 are calculated as:

$$\frac{100}{1024}\left|\vec{s}^{(1)H} \cdot \vec{s}^{(k)}\right|^2 = \frac{100}{1024}\left|\sum_{i=0}^{15} P_i^{(1)} \cdot P_{i+l}^{*(k)}\right|^2, \quad \text{Equation 7}$$

$$k = 1, 2, \ldots 16$$

where k=1 for signature 1, k=2 for signature 2, . . . k=16 for signature 16 and for case 1, l=0; case 2, l=1; case 3, l=2; and case 4, l=3. The value 1024 is derived by:

$$1024 = \left|\vec{s}^{(1)} \cdot \vec{s}^{(1)H}\right|^2, \text{ where } \vec{s}^{(1)} = \text{signature 1}, \quad \text{Equation 8}$$

and where $$\vec{s}^{(1)H} \cdot \vec{s}^{(1)} = \underbrace{\begin{bmatrix} A & A & A & -A & -A & -A & A & -A \\ -A & A & A & -A & A & -A & A & A \end{bmatrix}}_{16 \text{ symbols}} \quad \text{Equation 9}$$

$$\begin{bmatrix} A^* \\ A^* \\ A^* \\ -A^* \\ -A^* \\ -A^* \\ A^* \\ -A^* \\ -A^* \\ A^* \\ A^* \\ -A^* \\ A^* \\ -A^* \\ A^* \\ A^* \end{bmatrix}$$

$$= 16 \times A \cdot A^*$$
$$= 16 \times (Hj)(1-j)$$
$$= 16 \times 2$$
$$= 32$$

AND $A = 1 + J$
$A^* = $ conjugate of $A(1 - j)$
therefore $32^2 = 1024$

Figure 11:
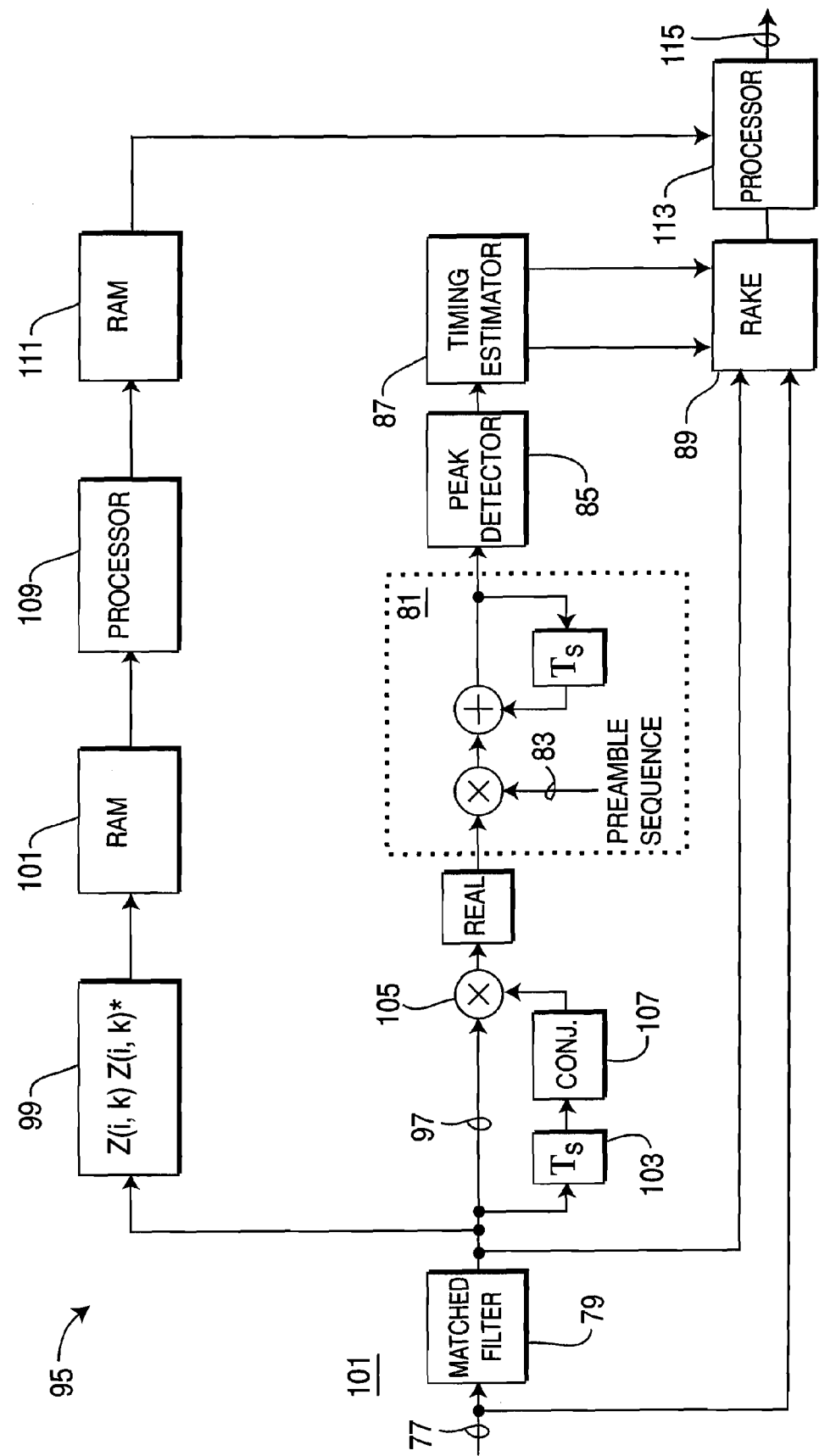
FIG. 11 is a system diagram of a non-coherent RACH preamble detector.

A RACH detector 95 made in accordance with this embodiment of the present invention is shown in FIG. 11. As previously described in the prior art receiver shown in FIG. 6, the received RACH 77 is demodulated and coupled to the input of the matched filter 79. The output of the matched filter 79 is coupled to the RAKE 89, to a time delay unit 103, a first mixer 105, and a first processor 99. Each received preamble signature 97 is delayed by one symbol length $T_s$, which is 256 chips, in the delay unit 103. The output of the time delay unit 103 is coupled to conjugate processor 107 which converts the received symbol to its complex conjugate. The output of the complex conjugate processor 107 is coupled to the first mixer 105 where the real part of the complex number is multiplied by the preamble signature symbol and output to the preamble correlator 81. The preamble correlator 81 correlates a possible signature with a sequence of outputs based on the symbol sequence. This sum is compared to a threshold, and if it exceeds the threshold by the end of the sixteenth symbol, a signature is detected. Since there are 16 computations, one for each signature, there may be more than one accumulation that exceeds its threshold for a given sample time. In that case, the accumulation with the largest value is selected as correct.

Contemporaneous with the above-described signature correlation, the matched filter 79 output 97 is input to the first processor 99 which computes the value of the energy for each symbol output. For each energy value computed, it is stored in the memory matrix 101. As previously described, after the energy values have been computed for a row of 19 symbols, a second processor 109 computes the summed energy for that given row which is then stored in a second memory 111. It should be noted that the memory matrix 101 and the second memory 111 may actually comprise a single RAM memory, instead of two separate components as shown. The energy exceeding a predetermined threshold is a tentative detection. After an accumulation of 256 possible signatures comprising 19 symbols has been accumulated in the second memory 111, a third processor 113 compares the 256 energy levels to normal signature detection on a one-to-one basis, thereby cross-verifying the results of each process to arrive at the correct signature sequence received.

To account for multiple Doppler channels, an alternative embodiment resolves the channels similar to the four case approach discussed above. To account for the Doppler channels, a phase rotation is introduced. The phase rotation corrects and compensates the phase changes experienced due to Doppler spreading. For coherent detection with m Doppler channels, m H 4H16 hypotheses are created. The greatest of m H 4H16 hypotheses is selected and the corresponding signature is identified.

If a received sequence is r(t), each time 19 samples r(n♦t), n=1, 2, 3, . . . 19, are collected, four cases, n=1, 2, 3, . . . 16 (case 1), n=2, 3, 4, . . . 17 (case 2), n=3, 4, 5, . . . 18 (case 3), and n=4, 5, 6, . . . 19 (case 4) are considered. To resolve Doppler, each case is then correlated with 16 signatures with m different phase rotations corresponding to m Doppler channels. The outputs of the correlation with phase rotations are;

$$y_{ik} = \sum_{n=1}^{16} |r(n\Delta t) \times \vec{s}_i \times \exp(-j \cdot 2\pi f_{0k} n\Delta t)|^2, \quad \text{Equation 10}$$

where i=1, 2, 3, . . . 16; k=1, 2, 3, . . . m; $2\pi f_{0k}$ is the phase rotation of kth Doppler channel; and $s_i$, where i=1, 2, 3, . . . 16 are possible signatures.

An example frequency rotation of five Doppler channels is: ($f_{01}, f_{02}, f_{03}, f_{04}, f_{05}$)=(−200 Hz, −100 Hz, 0, 100 Hz, 200 Hz); with a spacing of 100 Hz in between. Each case generates m H 16 hypotheses. Four cases create m H 16 H 4 hypotheses. The preamble signature with the greatest correspondence to m H 16 H 4 hypotheses is selected.

A receiver using coherent detection with multiple Doppler channels made in accordance with this embodiment of the present invention is shown in FIGS. 12A-B. In FIG. 12A, the received RACH 77 is coupled to the matched filter 79 to correlate with a spreading code (256 chips). As discussed above, one symbol is output from the matched filter every 256 chips until nineteen symbol outputs are collected and stored in the memory matrix 101. Sixteen consecutive symbol outputs among nineteen symbol outputs are assembled and the four cases are formed.

Each of the four sixteen consecutive sample cases is correlated in the preamble correlator 119 with each of the sixteen preamble sequences on m Doppler channels. The generated m H 16 H 4 hypotheses with are then stored in a second memory 121. The case with the greatest energy from the m H 16 H 4 hypotheses is selected 123 and the corresponding preamble signature is identified. FIG. 12B shows a detailed block diagram of the preamble correlator for a given preamble sequence and a given Doppler channel, (i.e., having frequency shift of $f_{0k}$, k=1 ... m).

An alternative embodiment of the present invention is based on the 16×16 signature matrix shown in FIG. 13. In utilizing this embodiment of the present invention, a new signature set is created by differentially encoding the signature matrix set forth in FIG. 13. The encoding rule is as follows. First, S(i,k), M(i,k) and R(i,k) are defined as:

S(i,k)=kth element of signature i;
M(i,k)=kth element of proposed new transmitted signature set; and
R(i,k)=kth element of the proposed new replica set, to be stored in the receiver.

Then the elements are mapped as follows: map A--->1 and B--->j=sqrt(-1), and set M(i,0)=A=1 and set R(i,0)=A=1. For k=1 to 15 we have the following:

$$M(i,k)=M(i,k-1)xS(i,k) \qquad \text{Equation 11}$$

$$R(i,k)=S^*(i,k) \qquad \text{Equation 12}$$

* denotes complex conjugate:
If S(i,k)=1, R(i,k)=1
If S(i,k)=j, R(i,k)=-j

This rule can be summarized in FIG. 14, where the left column represents the four possible values of M(i,k-1) and the top row represents the four possible values of S(i,k). FIG. 15 shows an original uncoded sequence and its transformation into a differentially encoded sequence.

In the receiver, these symbols are the differentially decoded. Arbitrarily starting with D(0)=1, the decoded symbols D(k), k=0 ... 15 are given in terms of the received coded symbols C(k) as:

$$D(i,k)=C(i,k)xC(i,k-1)^* \qquad \text{Equation 13}$$

The correlation against the preamble signature is then performed, whereby Sum (i)=0. For i=0 to 15

$$\text{Sum}(i)=\text{Sum}(i)+D(i,k)_cR(i,k) \qquad \text{Equation 14}$$

The full new transmitted signature set is shown in FIG. 16. This same technique can be applied to the preamble signatures shown in FIG. 13 by replacing A by B; and B by A.

What is claimed is:

1. A code division multiple access (CDMA) subscriber unit comprising:
   a receiver;
   circuitry configured to select one out of sixteen preamble signatures;
   circuitry configured to generate a code based on the selected preamble signature and to phase rotate the code to generate a processed preamble signature signal, wherein the processed preamble signature signal is used in processing a CDMA random access channel (RACH) signal;
   a transmitter configured to transmit the RACH signal.

2. The CDMA subscriber unit of claim 1 wherein the processed preamble signature signal is used for correlation with a received sequence.

3. The CDMA subscriber unit of claim 1 wherein the processed preamble signature signal is used to resolve Doppler resulting from a wireless transfer of the RACH signal through the RACH.

4. The CDMA subscriber unit of claim 1 wherein the RACH signal comprises a preamble portion and a data portion.

5. The CDMA subscriber unit of claim 1, wherein the RACH signal includes lower data rate information.

6. The CDMA subscriber unit of claim 1, further comprising receiving a channel assignment in response to the RACH signal.

7. The CDMA subscriber unit of claim 1, further comprising circuitry configured to generate a pseudorandom-noise sequence.

* * * * *

UNITED STATES PATENT AND TRADEMARK OFFICE
CERTIFICATE OF CORRECTION

PATENT NO. : 8,036,180 B2  
APPLICATION NO. : 12/430414  
DATED : October 11, 2011  
INVENTOR(S) : Dick et al.

Page 1 of 1

It is certified that error appears in the above-identified patent and that said Letters Patent is hereby corrected as shown below:

ON THE TITLE PAGE

Item (56) U.S. PATENT DOCUMENTS, page 1, right column, after "6,259,724 B1 7/2001 Esmailzadeh", insert --6,310,869 10/2001 Holtzman et al.--.

At column 8, line 23, after "cessing may", insert --be--.

At column 13, line 4, after "hypotheses", delete "with".

Signed and Sealed this  
Twenty-sixth Day of March, 2013

Teresa Stanek Rea  
*Acting Director of the United States Patent and Trademark Office*